UNITED STATES PATENT OFFICE.

JEFFERSON L. FULTON AND JULIUS BRACE, OF COVINGTON, KENTUCKY.

IMPROVEMENT IN MATERIAL FOR ROOFING AND PAVING.

Specification forming part of Letters Patent No. 103,169, dated May 17, 1870.

*To all whom it may concern:*

Be it known that we, JEFFERSON L. FULTON and JULIUS BRACE, of Covington, county of Kenton, State of Kentucky, have invented a certain Process for Preparing Paving and Roofing Material, of which the following is a specification:

The nature of the invention consists in preparing paving or roofing material from rock bitumen, and other ingredients added, necessary to give the prepared material sufficient hardness, combined with elasticity and non-conducting character, to enable it to be subjected to the heat of the sun in summer without softening.

To enable others to prepare the same, we will proceed to describe the process and articles used by us, which we deem to be the best, though both may be varied in many ways without changing their character.

The necessary elements used in the process are bituminous limestone or rock, which is infused with bituminous and hydrocarbon oils, and is found in various parts of Kentucky, near Eaton, Preble county, Ohio, and in a quarry situate in the western part of the city of Chicago, near the intersection of Western and Grand avenues.

This bituminous rock differs from the mineral found in Seyssel, in France. The Seyssel product dissolves or crumbles when subjected to heat of about 212° Fahrenheit. The American product will not dissolve without being subjected to heat so great as to consume or burn up the bituminous matter. If limestone, it must be reduced to quicklime before crumbling.

The rock is crushed as fine as it is necessary to be used. To this is added artificial asphalt or natural bitumen, (with dead-oil to set or soften the asphalt,) pure dry clay, or the rock itself may be pulverized, or other similar substances used in lieu of the clay, to give body to the cement. Sharp sand, or broken stone or gravel, may be used to add to the durability, but it is not necessary with ordinary rock-bitumen.

If foreign sand or stone be used, not over twelve per cent. should be employed.

Natural rock-bitumen, which does not contain bituminous substances enough for the cementing properties required, will receive and take up artificial asphalt, if used with dead oil whose specific gravity is greater than water, and its vaporizing-point not less than 230° Fahrenheit, and will form an artificial compound much more durable than any combination of mineral substances and asphalts hitherto used.

We deem the following proportions the best adapted for ordinary pavements, though they may be varied as the paving is required to be cheap or durable, elastic or hard:

Bituminous rock, one hundred and fifty parts; pure dry clay or powdered rock, twenty-five parts; bitumen, either natural or artificial, twenty-five parts; with two parts dead-oil or hydrocarbon-oil, of the gravity above named; and twenty-five parts sand or broken stone.

Take the bituminous rock, and powder or crush in any ordinary mill. One-third of the amount should be well pulverized; the remainder may be in pieces not larger than one-half inch in diameter.

The quality of the rock should then be tested to ascertain the amount of bituminous matter contained in it, to ascertain the amount of asphalt and mineral hydrocarbon-oil to be added. The rock bitumen should contain from eight to fifteen per cent. of bituminous matter, and enough asphalt should be added to make the entire mass from fifteen to twenty per cent. bituminous.

This test may be made by exhaustive distillation, or by dissolving in naphtha or light hydrocarbon-oil, in which the bitumen in the rock is easily soluble.

The crushed and pulverized rock should then be subjected to a slow process of heat, ranging from 200° to 230° Fahrenheit, and thoroughly stirred till the bitumen and rock are sufficiently softened to coalesce, and until the bituminous matter be added, (which should be ten parts asphalt and one part dead-oil.) Twenty-five parts of pure dried clay, chalk, or fine pulverized rock, are then added.

The whole mass should be thoroughly stirred during the entire process of heating. Twenty-five parts of fine sharp sand or broken stone may be added without materially affecting the tenacity of the cement, while it adds to its durability. The whole mass is continued at a temperature of not more than 230° Fahrenheit, and stirred or agitated until the compound is thoroughly mixed, when it may be put down into pavements.

If it is desired to be prepared for putting down into pavements or making roofs at a future time, the pulverized clay and sand should not be added, but the compound can be run into cakes and easily transported to any desired place. When it is desired to use the material, it should be again heated and melted, the clay and sand added, as before described, and put down while hot, in the manner described.

To have the cement sufficiently strong to bind and unite all the elements, it should contain, in all, from fifteen to twenty per cent. of bituminous substances, and the dead-oil is added to give it the required tenacity.

The clay or pulverized rock forms the body of the cement, which coalesces with and forms a complete chemical combination with the bituminous substances, natural and artificial. The clay also acts as a non-conducting agent in repelling the rays of the sun.

The natural porosity of the rock, with the clay and cement, renders the material elastic. The more clay and pitch is used the more elastic will be the compound.

When combined in the manner described, the material, when cold, forms an artificial bituminous stone or concrete, unlike any other material yet used.

We claim—

The application of bituminous rock, herein described, in the preparation of roofing and paving materials, by treating and combining the same with other suitable substances, substantially as set forth.

JEFFERSON L. FULTON.
JULIUS BRACE.

Witnesses:
E. E. WOOD,
HERMAN MERRELL.